(12) United States Patent
Nakagawa et al.

(10) Patent No.: US 6,217,051 B1
(45) Date of Patent: *Apr. 17, 2001

(54) MAIN STAND MOUNTING STRUCTURE IN A TWO-WHEELED MOTOR VEHICLE

(75) Inventors: Mitsuo Nakagawa; Seiichi Kurohori, both of Wako (JP)

(73) Assignee: Honda Giken Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/145,961

(22) Filed: Sep. 3, 1998

(30) Foreign Application Priority Data

Sep. 13, 1997 (JP) .................................... 9-268016

(51) Int. Cl.[7] ...................................... B62H 3/00
(52) U.S. Cl. ............................................ 280/303
(58) Field of Search ................... 280/293, 298, 280/299, 300, 301, 302, 303; 180/219

(56) References Cited

U.S. PATENT DOCUMENTS

| | | | | |
|---|---|---|---|---|
| 559,698 | * | 5/1896 | Gaston ............................. | 280/293 |
| 1,127,431 | * | 2/1915 | Green .............................. | 280/293 |
| 3,658,360 | * | 4/1972 | Wood .............................. | 280/302 |
| 4,298,211 | * | 11/1981 | Shitamori ........................ | 280/297 |
| 4,582,336 | * | 4/1986 | Onoda ............................. | 280/293 |
| 4,693,488 | * | 9/1987 | Bernocco ........................ | 280/293 |
| 5,553,471 | * | 9/1996 | Hanners .......................... | 70/235 |
| 5,623,855 | * | 4/1997 | Miles .............................. | 74/564 |

FOREIGN PATENT DOCUMENTS 58-4676    1/1983   (JP) .

* cited by examiner

Primary Examiner—Kevin Hurley
(74) Attorney, Agent, or Firm—Birch, Stewart, Kolasch & Birch, LLP

(57) ABSTRACT

A two-wheeled motor vehicle includes a plurality of batteries arranged between right and left side members extending longitudinally on both sides of the body of the vehicle. A main stand is attached to rear portions of the right and left side members. A main stand mounting structure includes a pair of main stand brackets for mounting the main stand which are secured respectively to the right and left side members. Stays supported by the main stand brackets through shafts extend from both right and left sides of the main stand. The right and left main stand brackets are each independent. The right and left stays extend from the main stand, and pivot shafts of the main stand are made short as right and left independent shafts. Consequently, it is no longer required to provide a long pivot shaft on the frame side, and hence it is possible to reduce the weight of the frame.

34 Claims, 16 Drawing Sheets

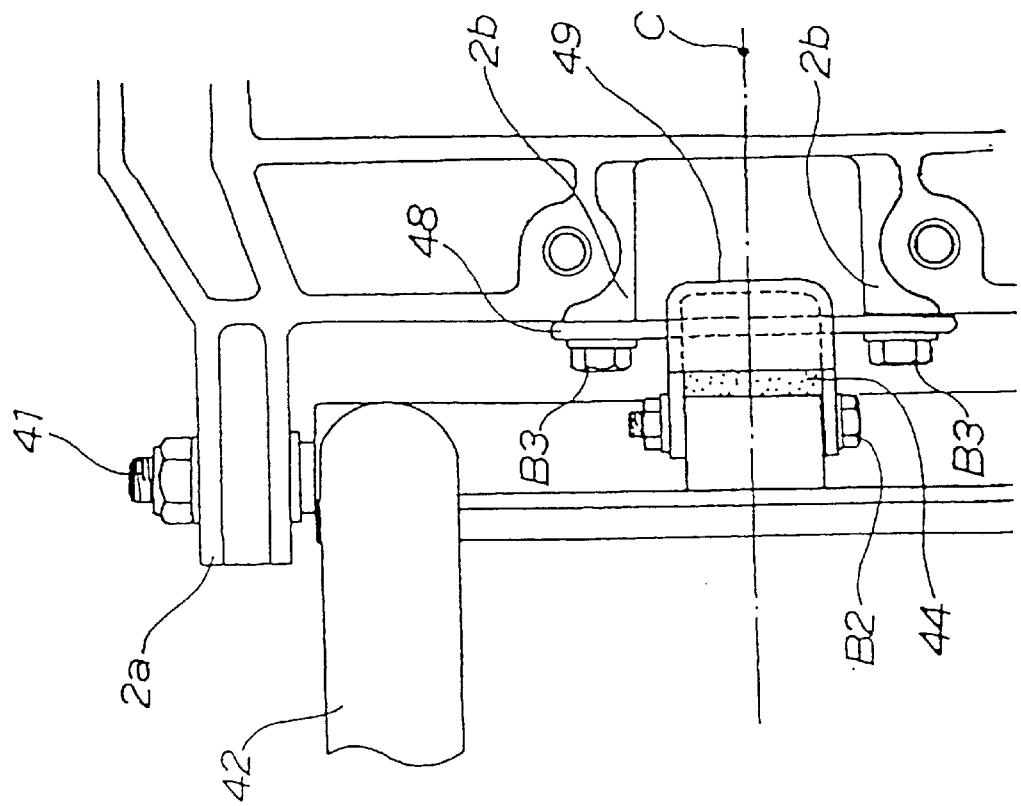
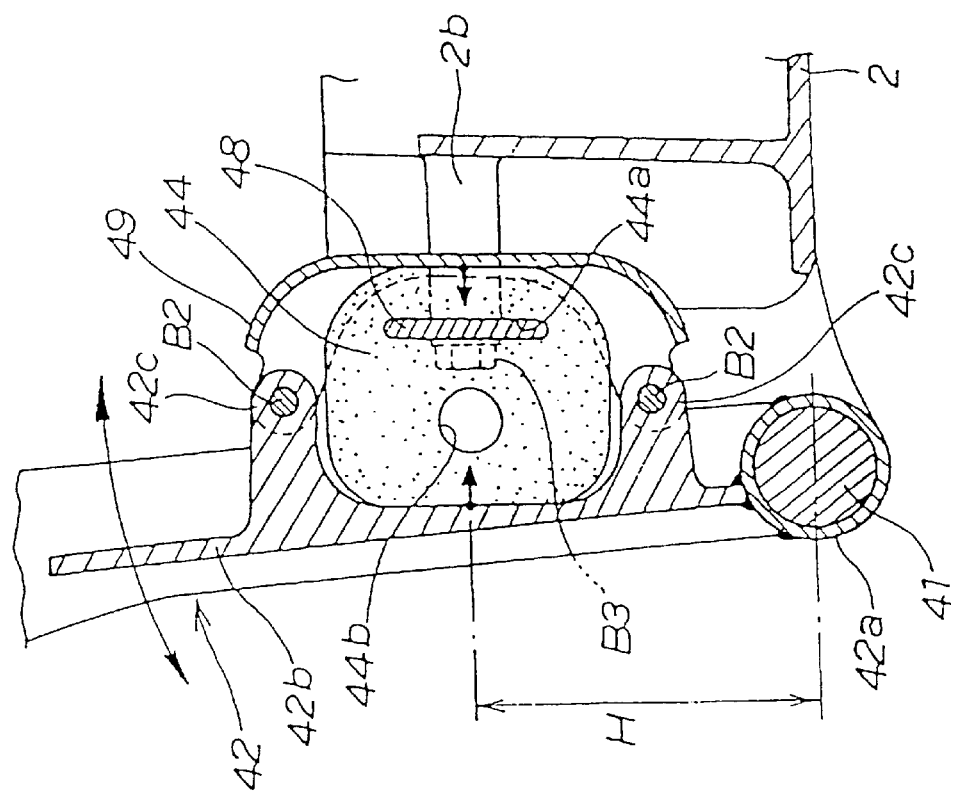
FIG. 7(b)
FIG. 7(a)

MAIN STAND MOUNTING STRUCTURE IN A TWO-WHEELED MOTOR VEHICLE

BACKGROUND OF THE INVENTION

1. Field of the Invention

The present invention relates to a main stand mounting structure in a two-wheeled motor vehicle.

2. Description of the Background Art

A main stand mounting structure in a two-wheeled motor vehicle is shown, for example, in Japanese Laid Open Patent No. Sho 58-4676. In FIG. 3 of the Japanese Laid Open Patent, a main stand is secured to a vehicle body frame through a support pipe. Thus, as disclosed in the above unexamined publication, a main stand mounting structure has heretofore been utilized in which the main stand is swingably attached to the vehicle body frame through the support pipe which extends transversely to the vehicle body. If the two-wheeled vehicle is provided with a power unit including a motor, and if a heavy battery is to be mounted between a pair of right and left side members, the spacing between the side members inevitably becomes large. As such, the support pipe becomes much heavier, and the vehicle weight increases.

SUMMARY OF THE INVENTION

It is therefore an object of the present invention to simplify the vehicular body frame by making improvements to the main stand mounting structure. More specifically, according to the present invention, a two-wheeled motor vehicle is provided wherein a plurality of batteries are arranged between right and left side members extending longitudinally on both sides of the body of the vehicle. A main stand is attached to rear portions of the right and left side members. A main stand mounting structure includes main stand brackets for mounting the main stand, which are secured respectively to the right and left side members. Stays extend from both right and left sides of the main stand. The stays are supported by the main stand brackets through shafts.

The right and left main stand brackets are each independent. The right and left stays extend from the main stand. Pivot shafts of the main stand are set short as right and left independent shafts. Consequently, it is no longer required to provide a long pivot shaft on the frame side, which makes it possible to reduce the weight of the frame.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIGS. 7(a) and 7(b) are views showing a structure for mounting a resin spring according to the present invention;

DETAILED DESCRIPTION OF THE PREFERRED EMBODIMENTS

An embodiment of the present invention will now be described with reference to the accompanying drawings. In the following description, front, rear, left, right, upper and lower represent respective directions as seen from the rider's perspective, and Fr, Rr, L and R stand for front, rear, left side and right side, respectively. Further, it is assumed that the drawings should be seen in the directions of these symbols.

Figure 1:
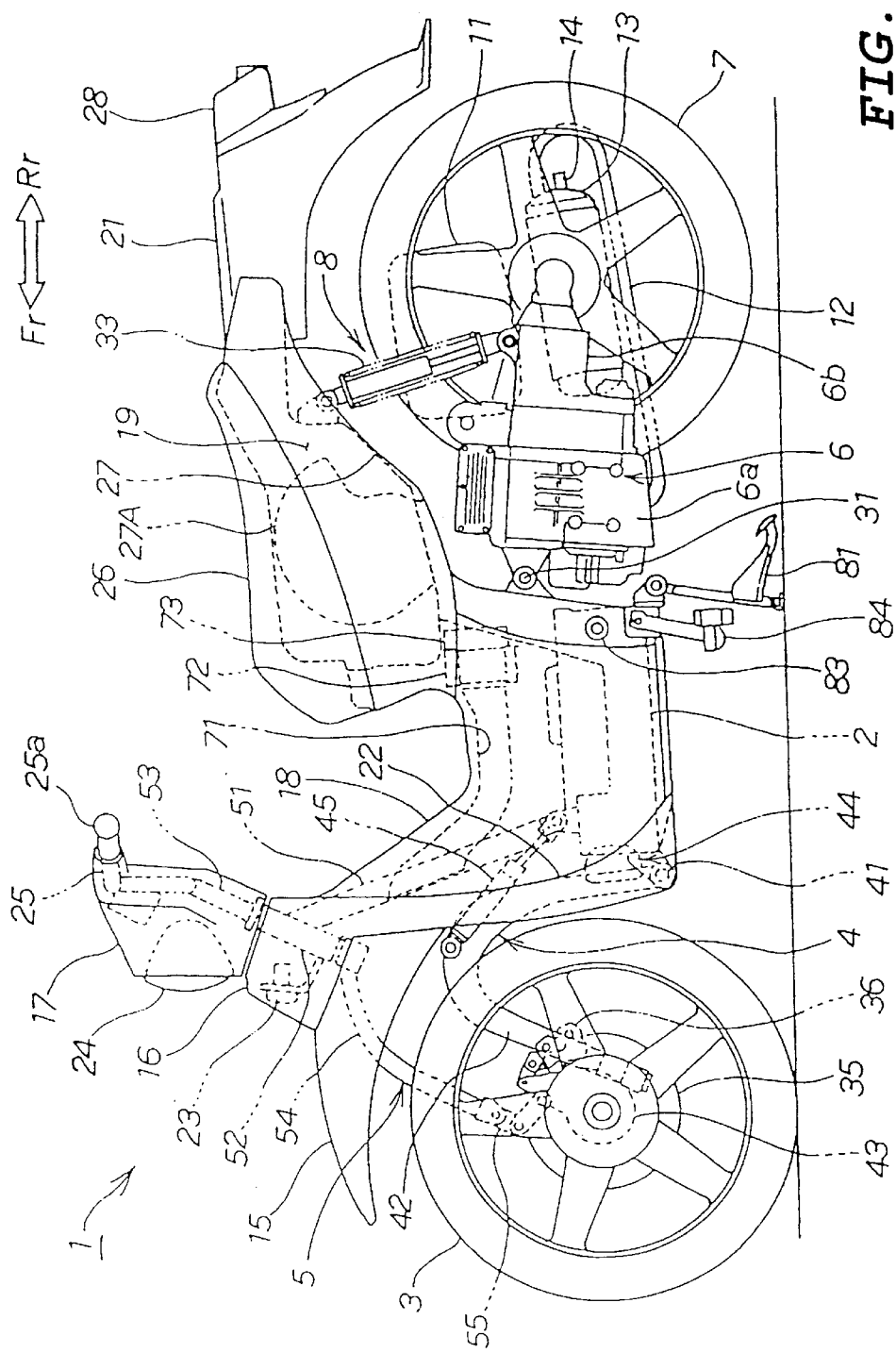
FIG. 1 is a side view of a two-wheeled motor vehicle according to the present invention.

Referring now to FIG. 1, a two-wheeled motor vehicle 1 is shown. The two-wheeled motor vehicle 1 includes a main frame 2 fabricated into a flame-shape, which also serves as a battery receptacle box which is disposed at a lower central position thereof. A swing arm front suspension system 4 which suspends a front wheel 3, and a steering system 5 separate from the front suspension system 4, are attached to the front portion of the main frame 2. Further, a power unit 6 and a rear suspension system 8 which suspends a rear wheel 7 are attached to the rear portion of the main frame 2.

The power unit 6 includes an engine 6a and a transmission motor 6b as drive sources. The front wheel 3 and the rear wheel 7 are wheels of a large diameter, typically 14 to 20 inches. In the inner part of the rear wheel 7 in the figure, there are mounted an air cleaner 11, an exhaust pipe 12, a muffler 13 and a tail pipe 14. The vehicle body is covered with a front fender 15, a front cover 16, a front handle cover 17, a center cowl 18, a rear cowl 19, and a rear fender 21, successively from the front to the rear.

As shown in FIG. 1, the two-wheeled motor vehicle 1 further includes a leg shield 22, a horn 23, a front lamp 24, a handle bar 25, a seat 26, a helmet box 27 for receiving a helmet 27A, a tail lamp 28, an air duct 71, a radiator 72, and a fan 73.

Figure 2:
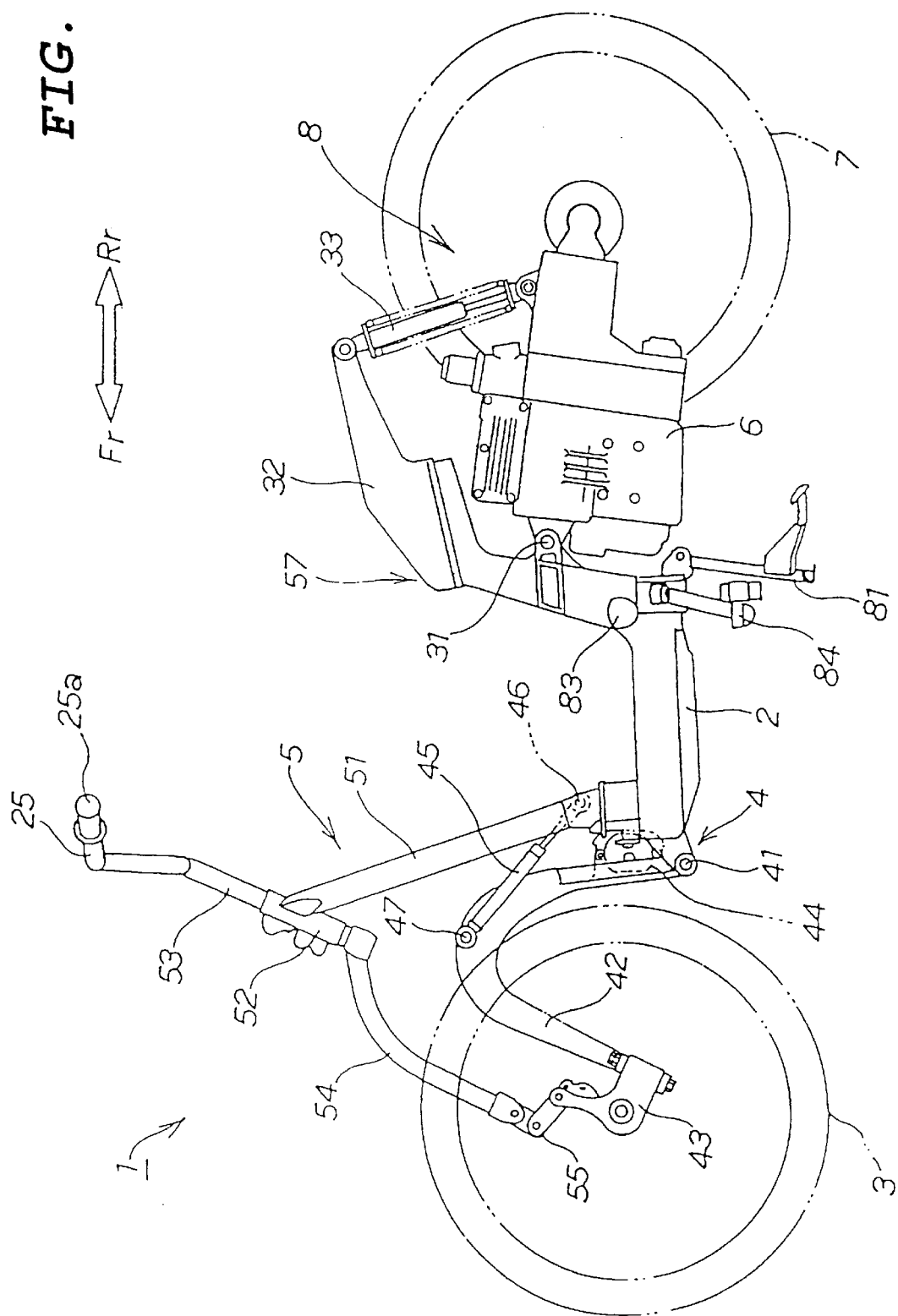
FIG. 2 is a side view of a main frame and the vicinity thereof according to the present invention.

Reference will now be made to FIG. 2 and the power unit 6 and the rear suspension system 8. The power unit 6 is connected to an upper position of the rear portion of the main frame 2 swingably through a rear pivot shaft 31. The rear wheel 7 is mounted to the power unit 6. Further, a seat rail 32 for mounting the seat 26 and helmet box 27 shown in FIG. 1 is secured on top of the rear portion of the main frame 2. A rear cushioning device 33 is connected to the seat rail 32 on the left side of the rear wheel 7.

The main frame 2 disposed at a lower front position of the two-wheeled motor vehicle 1, the seat rail 32 disposed on top of the rear portion of the main frame 2, and a head pipe post 51 disposed on top of the front portion of the main frame, comprise a vehicle body frame 57.

Figure 3:
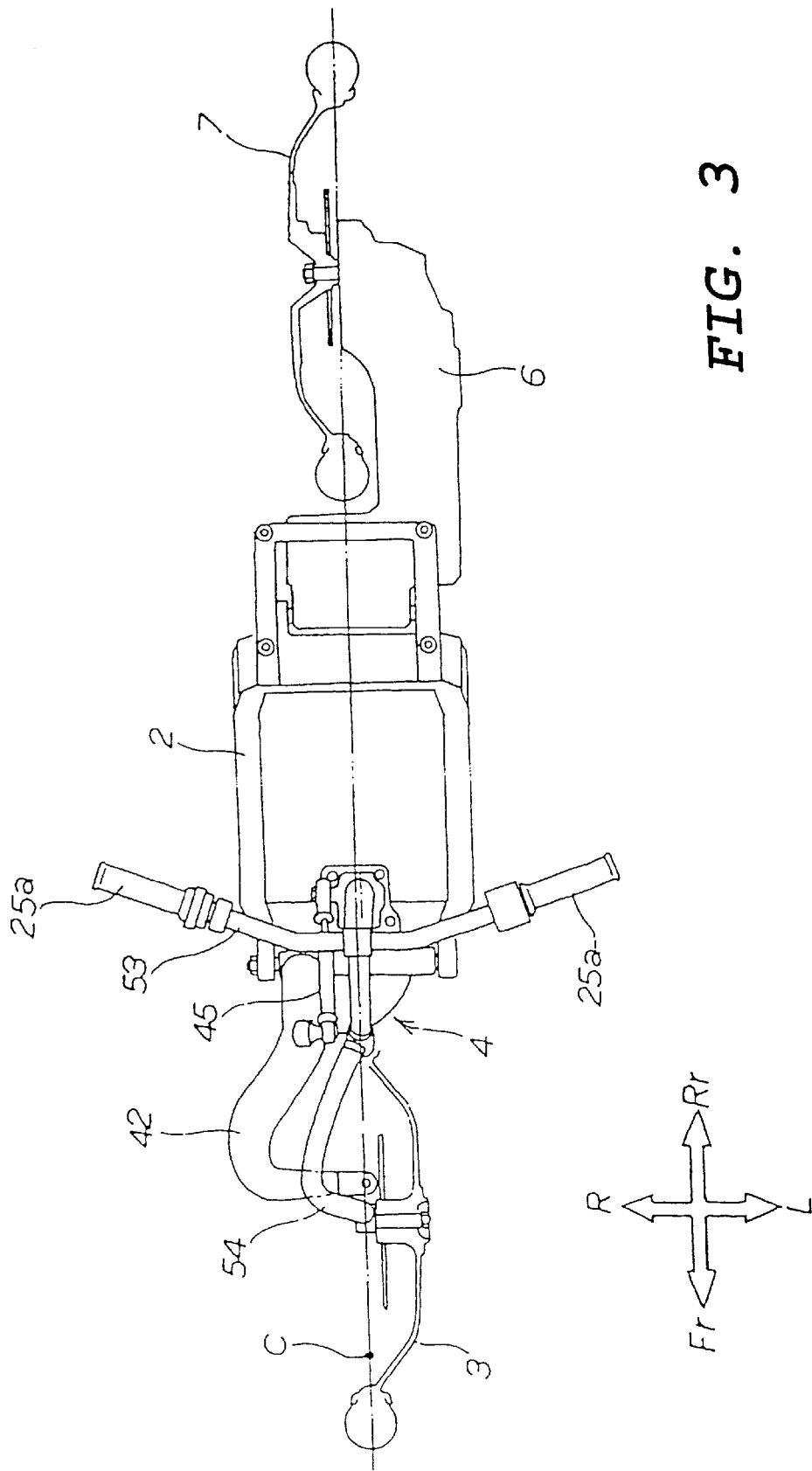
FIG. 3 is a plan view of the main fame, front and rear suspension systems and a steering system according to the present invention.

FIG. 3 is a plan view of the main frame, front-rear suspension system and a steering system which are used in the present invention. A front swing arm 42 in the front suspension system 4, which will be described later, extends forward from the front portion of the main frame 2 to support the front wheel 3 in a cantilevered state. At the other end, the power unit 6 extends backward from the rear portion of the main frame 2 to support the rear wheel 7 in a cantilevered state.

The front swing arm 42 is offset to one side (the right-hand side) from the center C of the vehicle body, while the power unit 6 is offset to the other side (the left-hand side) from the center C of the vehicle body, so that the vehicle 1 is well balanced in weight right and left.

Figure 4:
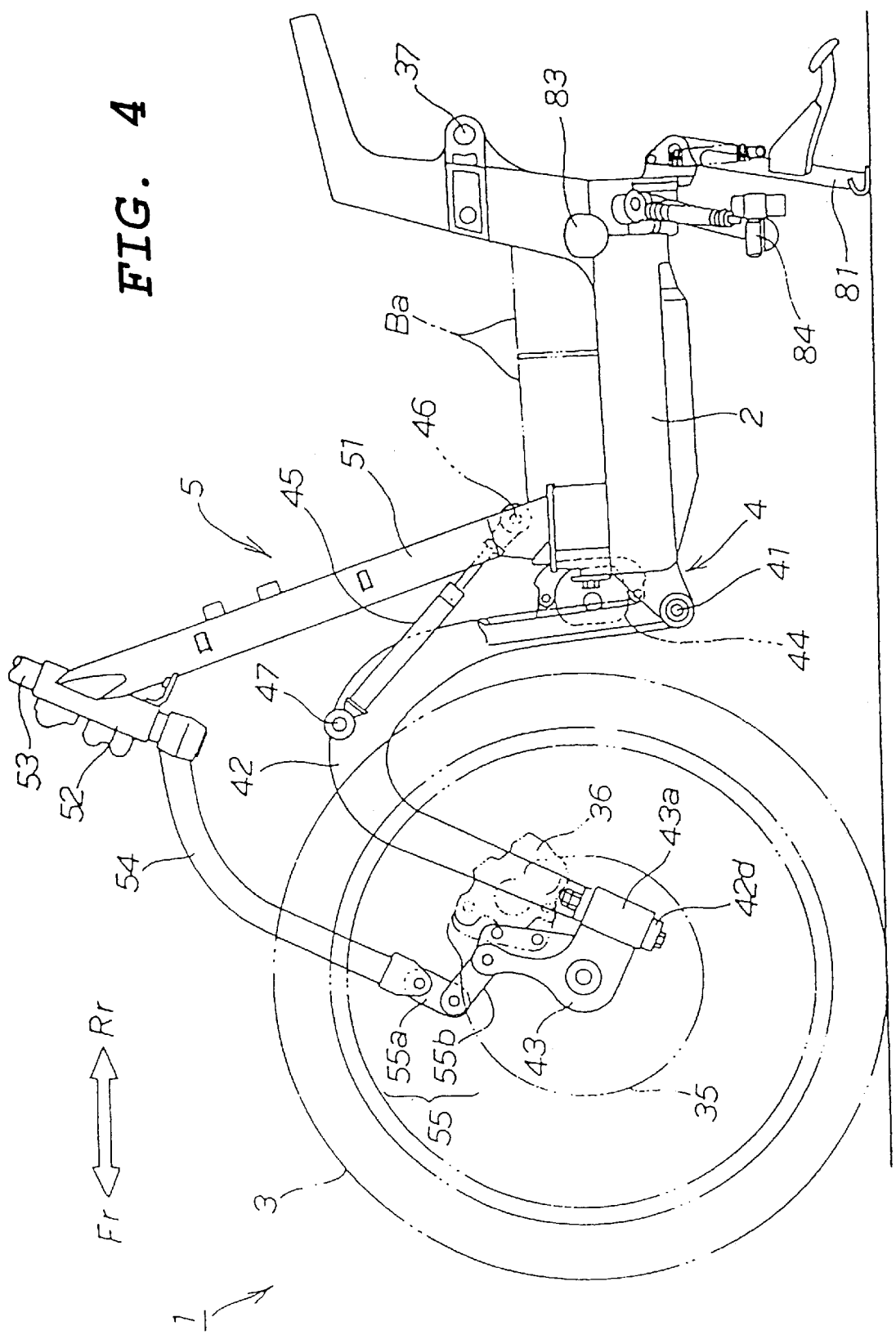
FIG. 4 is a side view of the main frame, front suspension system and steering system according to the present invention.

FIG. 4 is a side view of the main frame, front suspension system and steering system which are used in the present invention. In the front suspension system 4, the front swing arm 42, which is generally in an inverted U-shape in side view, extends from a lower position of the front portion of the main frame 2 through the front pivot shaft 41, and the front wheel 3 is rotatably connected to the front swing arm 42. To be more specific, a knuckle 43 attached to the front wheel 3 is connected to one end of the front swing arm 42 in a right and left rotatable manner.

The front suspension system 4 also includes a buffer member 44 for cushioning a shock from the road surface in the swing direction of the front swing arm 42. A front damper 45 is also provided for damping the vibration amplitude in the swing direction of the front swing arm 42. The buffer member 44 and the front damper 45 are separated from each other. The buffer member 44 comprises a resin spring for cushioning a shock in the swing direction of the front swing arm 42, and is disposed between the main frame 2 and the front swing arm 42.

The front damper 45 is mounted between the main frame 2 and the front swing arm 42. More specifically, one end portion of the front damper 45 is secured with a pivot shaft 46 to the right side portion (the back side in the figure) of the base end of the head pipe post 51 which will be described later, while the opposite end portion of the front damper 45 is secured with a pivot shaft 47 to the left side portion of the top of the swing arm 42. One end portion of the front damper 45 may be mounted directly to the main frame 2.

In the steering system 5, the head pipe post 51 extends obliquely upward from the top of the front portion of the main frame 2. A head pipe 52 is fixed to the upper end of the head pipe post 51. A handle post 53 is rotatably fitted in the head pipe 52. A steering arm 54 is secured to the lower end of the handle post 53, and the front end (lower end) of the steering arm 54 is connected to the knuckle 43 through a link mechanism 55.

The link mechanism 55 is comprised of a combination of a first link 55a connected to the front end of the steering arm 54 and a second link 55b connected to the knuckle 43. The link mechanism 55 is disposed inside the front wheel 3 which is relatively large in diameter.

Since the link mechanism 55 is disposed within the front wheel 3, it is possible to attain an effective utilization of space. Also, it is possible to ensure a sufficient space below and behind the head pipe 52. Thus, the design freedom of the two-wheeled motor vehicle 1 is enhanced. In the case of a scooter type two-wheeled motor vehicle wherein a rider step 83 is removed from the vehicle 1 and the rider puts his or her feet on a low floor type foot rest (step floor) in an orderly manner, it is possible to ensure a sufficient space around the rider's feet.

A front brake disk 35 is also provides, as well as a caliper 36 which is secured to the knuckle 43. A bearing 37 is provided for supporting the rear pivot shaft 31.(see FIG. 2). A main stand 81, the rider step 83 and a side stand 84 are mounted to lower positions of the rear portion of the main frame 2.

Figure 5:
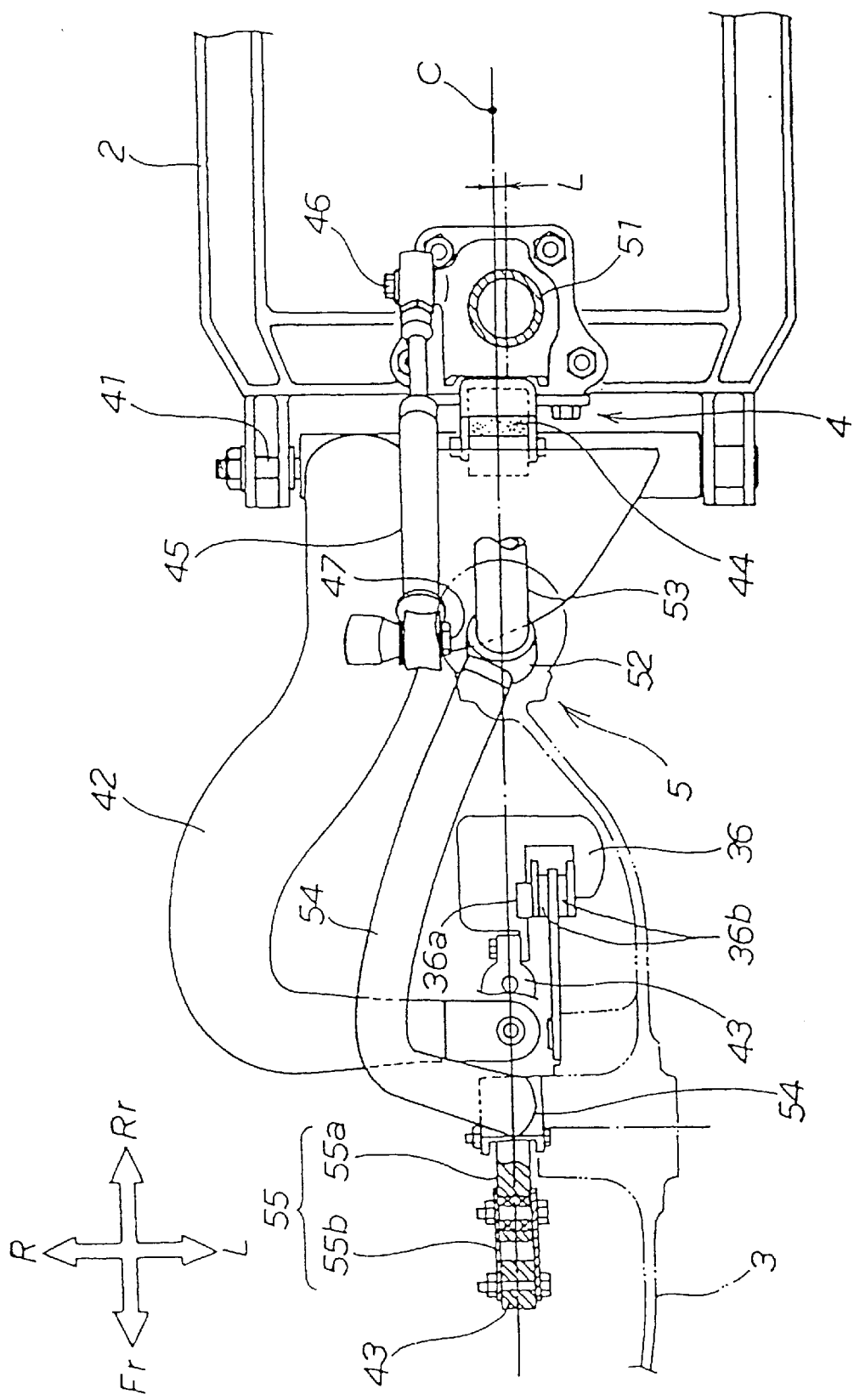
FIG. 5 is a plan view of the main frame, front suspension system and steering system according to the present invention.

FIG. 5 is a plan view of the main frame, front suspension system and steering system used in the present invention, in which the link mechanism 55 is shown in a developed state. The front swing arm 42 extends forward from the right-hand side of the front portion of the main frame 2 through the front pivot shaft 41 while curving rightward so as to bypass the front wheel 3. On the other hand, as shown in FIG. 5, the steering arm 54 extends forward from the lower end of the handle post 53 which lies at the vehicle body center (center line) C, while curving rightward so as to bypass the front wheel 3.

In FIG. 5, moreover, the center of the head pipe post 51 is offset by a distance L to one side (left side) from the vehicle body center C. Also, the front damper 45 is disposed on the other side (right side) of the vehicle body center C and adjacent to the head pipe post 51. The front damper 45 extends in parallel with the vehicle body center C. According to this arrangement, since the front damper 45 can be positioned as close as possible to the vehicle body center C, it is possible to minimize a bending moment acting on the front damper 45. Consequently, it is permissible to decrease the strength of the front damper 45, and hence it is possible to make the front damper in a compact size and shape. This is suitable for the swing arm mechanism of the front portion where the space is limited. The resin spring 44 is disposed at the vehicle body center C. Numeral 36a denotes a piston and numeral 36b denotes a brake pad.

Figure 6:
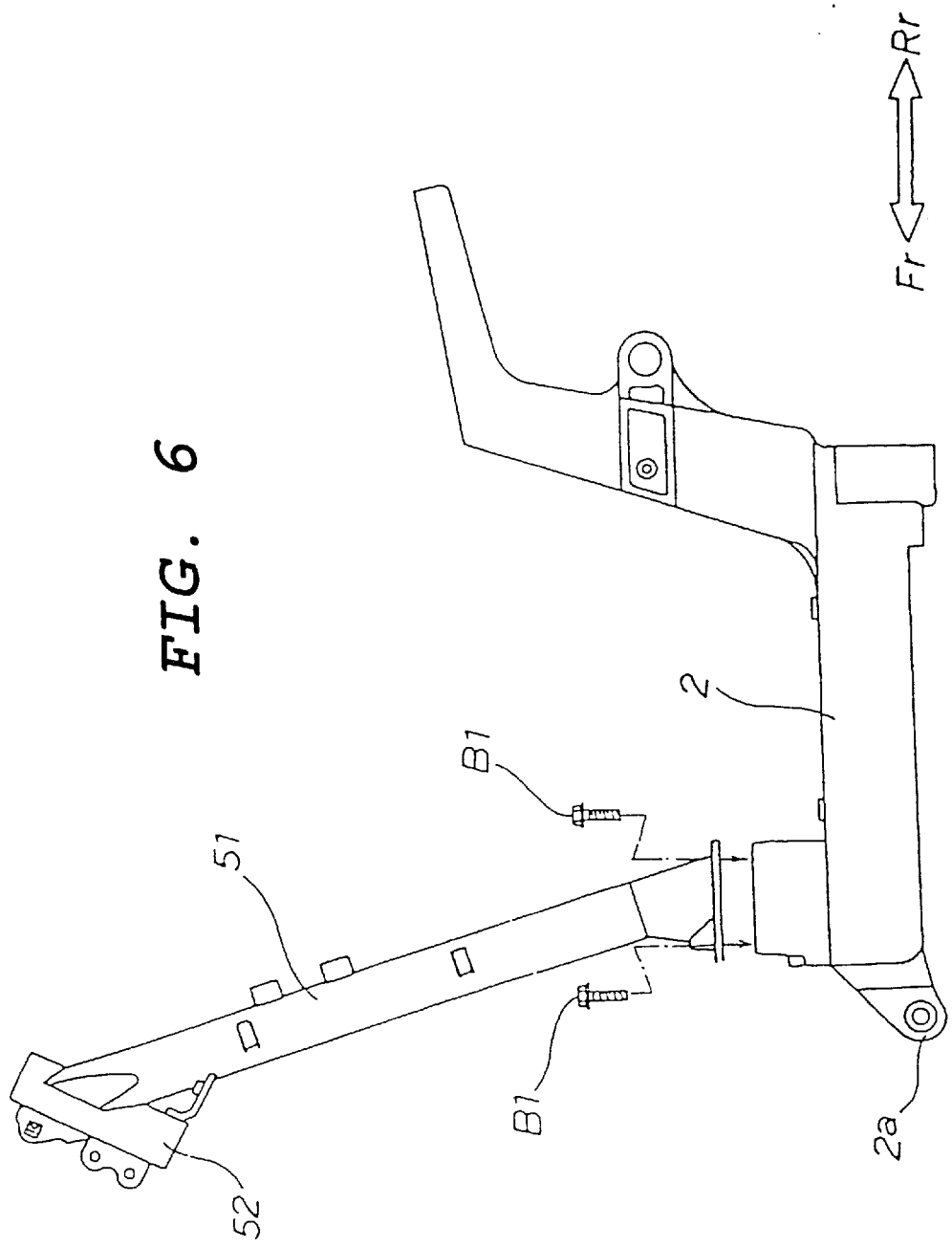
FIG. 6 is an exploded side view of the main frame and a head pipe post according to the present invention.

FIG. 6 is an exploded side view of the main frame and the head pipe post both used in the present invention. Generally, the caster angle of the steering varies somewhat depending on the vehicle model. Therefore, in the case of a vehicle body frame having a head pipe integral therewith, it is required to replace the entire vehicle body frame with a new one at every change of the caster angle. However, in the present embodiment, the main frame 2 and the head pipe post 51 are separated from each other. The head pipe post 51 is secured to the main frame 2 with a plurality of bolts B1. Also, the main frame 2 serves as a battery receptacle box for enhancing its versatility and is fabricated into a flame-shaped structure by casting an aluminum alloy for enhancing its rigidity.

By adopting such a structure, even when the vehicle model changes from one to another, the main frame 2 can be used in common, and all that is required is a mere replacement of only the head pipe post 51. Thus, the design freedom is enhanced.

Further, as shown in FIG. 4, the front suspension system 4 is a swing arm type so that a large load from the front wheel 3 is borne by the main frame 2 of a high rigidity through both the front swing arm 42 and the front pivot shaft 41. This arrangement makes it possible for the main frame 2 to bear such a large load positively and effectively. In other words, any large load is not imposed on the head pipe post 51.

Even in the case where the two-wheeled motor vehicle 1 is a scooter type vehicle wherein the rider step 83 is removed from the vehicle 1 and the rider puts his or her feet on a low floor type foot rest (step floor) in an orderly manner, a large load from the front wheel 3 can be borne by the highly rigid main frame 2 through the front pivot shaft 41.

FIGS. 7(a) and 7(b) illustrate a resin spring mounting structure in the present invention. The resin spring 44 is a block made of resin having resilience in order to exhibit a spring action. It has two through—holes formed in the transverse direction, those being a mounting hole 44a and a spring force setting hole 44b. The resin spring 44 is attached to the front portion of the main frame 2 at a position spaced upward from the front pivot shaft 41 by a predetermined distance H.

To be more specific, according to the structure for mounting the resin spring 44, a mounting plate 48 is inserted into the mounting hole 44a of the resin spring 44, and the mounting plate 48 is attached to the front portion of the main frame 2. On the other hand, the front and the rear of the resin spring 44 are sandwiched in between the back of the front swing arm 42 and a holding plate 49 attached to the back of the front swing arm 42.

Figure 8:
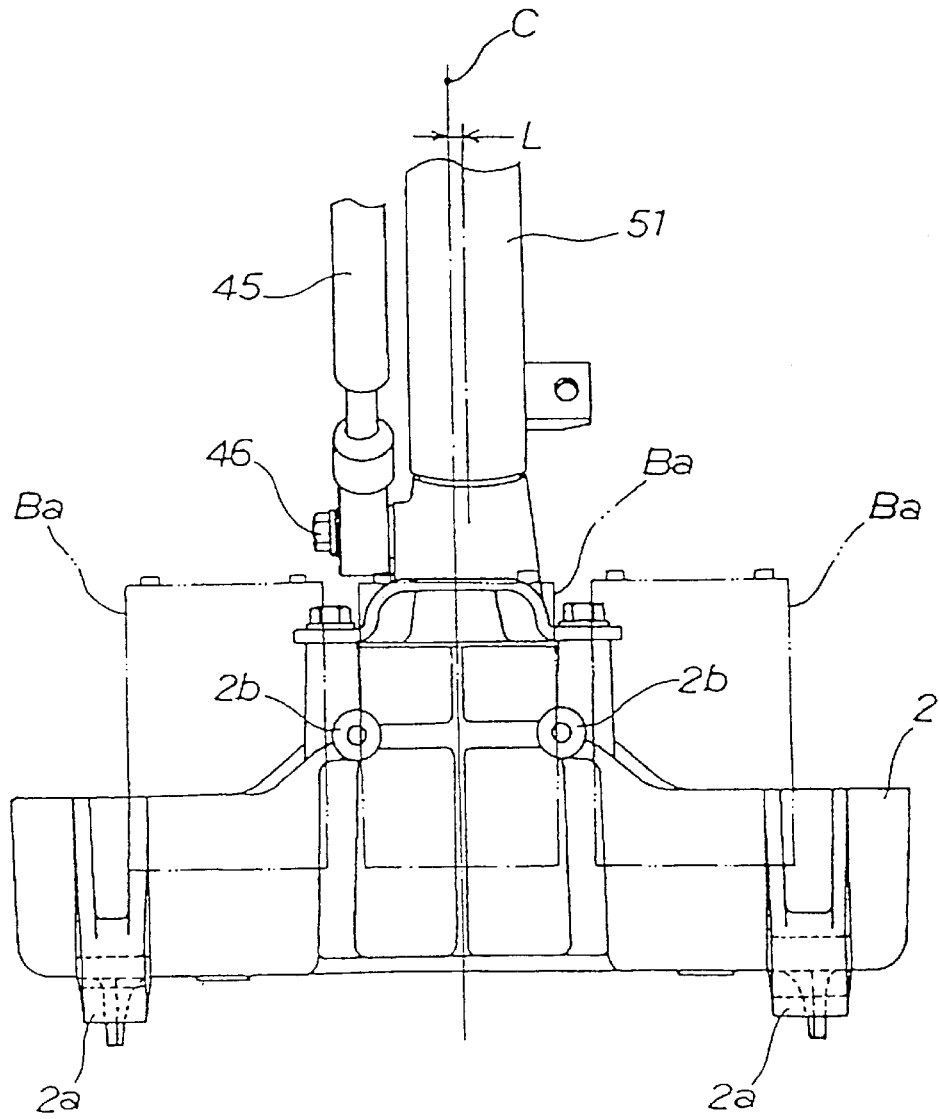
FIG. 8 is a front view of the main frame and the head pipe post.

FIG. 8 is a front view of the main frame and the head pipe post both used in the present invention, showing a structure in which one end portion of the front damper 45 is secured with the pivot shaft 46 to the right-hand side of the base portion of the head pipe post 51. Bearings 2a are used to support the front pivot shaft 41, and mounting portions 2b are provided on the resin spring mounting plate 48.

Figure 9:
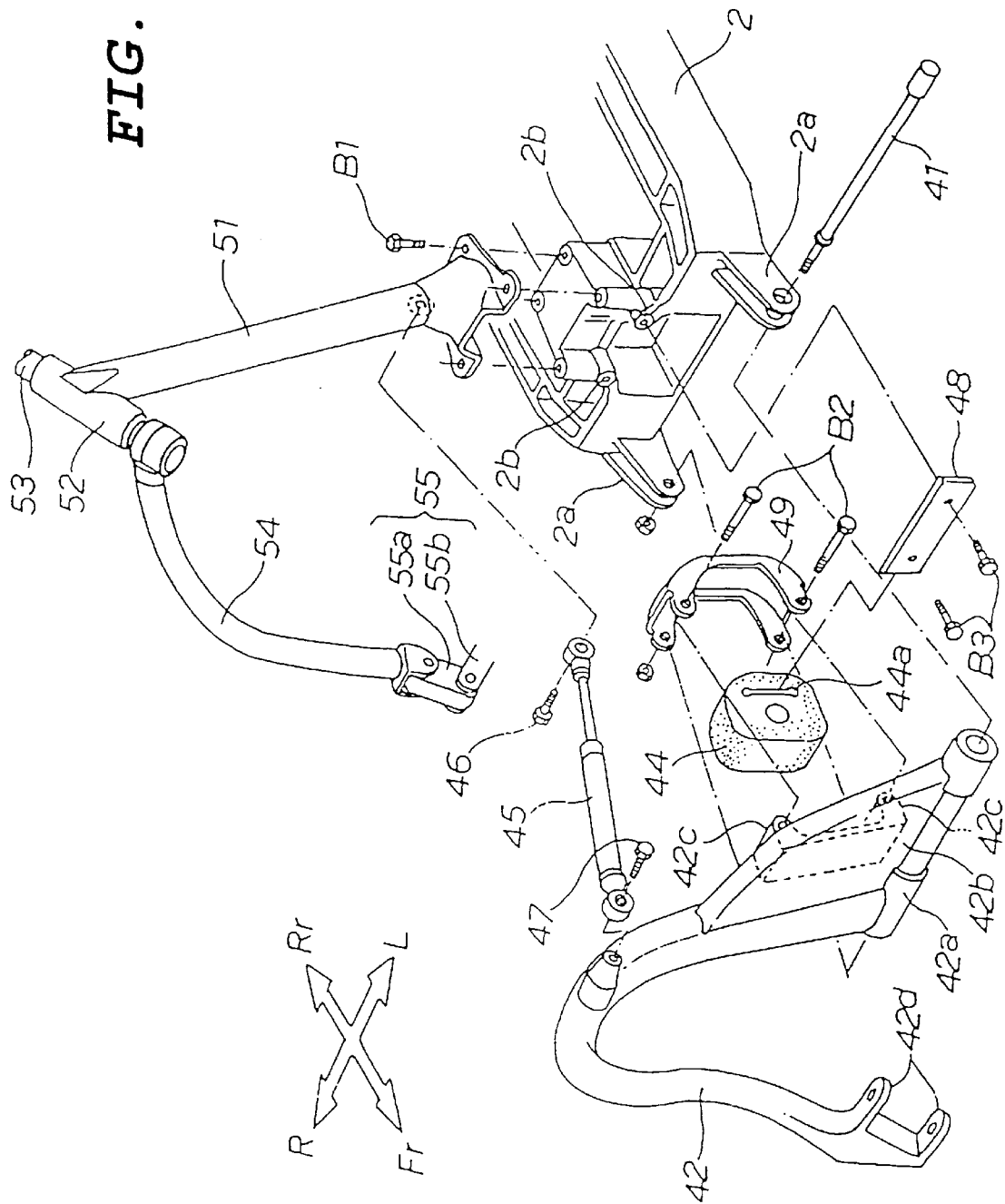
FIG. 9 is an exploded perspective view of the main frame, front suspension system and steering system.

FIG. 9 is an exploded perspective view of the main frame, front suspension system and steeling system used in the present invention. This figure illustrates in more detailed the construction of the front suspension system 4 and the steering system 5. As shown therein, a support pipe 42a of the front swing arm 42 is connected to the right and left bearings 2a, 2a of the main frame 2 through the front pivot shaft 41. The holding plate 49 is connected with two upper and lower bolts B2, B2 to connections 42c, 42c formed on a plate portion 42b of the front swing arm 42. The resin spring 44 is sandwiched in between the back of the plate portion 42b and the holding plate 49.

The mounting plate 48 is inserted into the mounting hole 44a formed in the resin spring 44, and both right and left end portions of the mounting plate 48 are secured to the mounting portions 2b, 2b of the main frame 2 with bolts B3, B3. Further, the head pipe post 51 is secured to an upper position of the front portion of the main frame 2 with bolts B1. The opposite end portion of the front damper 45 is connected to the top of the front swing arm 42 with the pivot shaft 47. The head pipe 52 is provided at the upper end of the head pipe post 51. The handle post 53 is rotatably fitted in the head pipe 52. The steering arm 54 is connected to the lower end of the handle post 53, and the link mechanism 55 is connected to the front end of the steering arm 55. The front swing arm 42 is provided at the front end thereof with a stem support member 42d for mounting a stem shaft 43a (see FIG. 4) of the knuckle 43 in a right-to-left rotatable manner.

Figure 10:
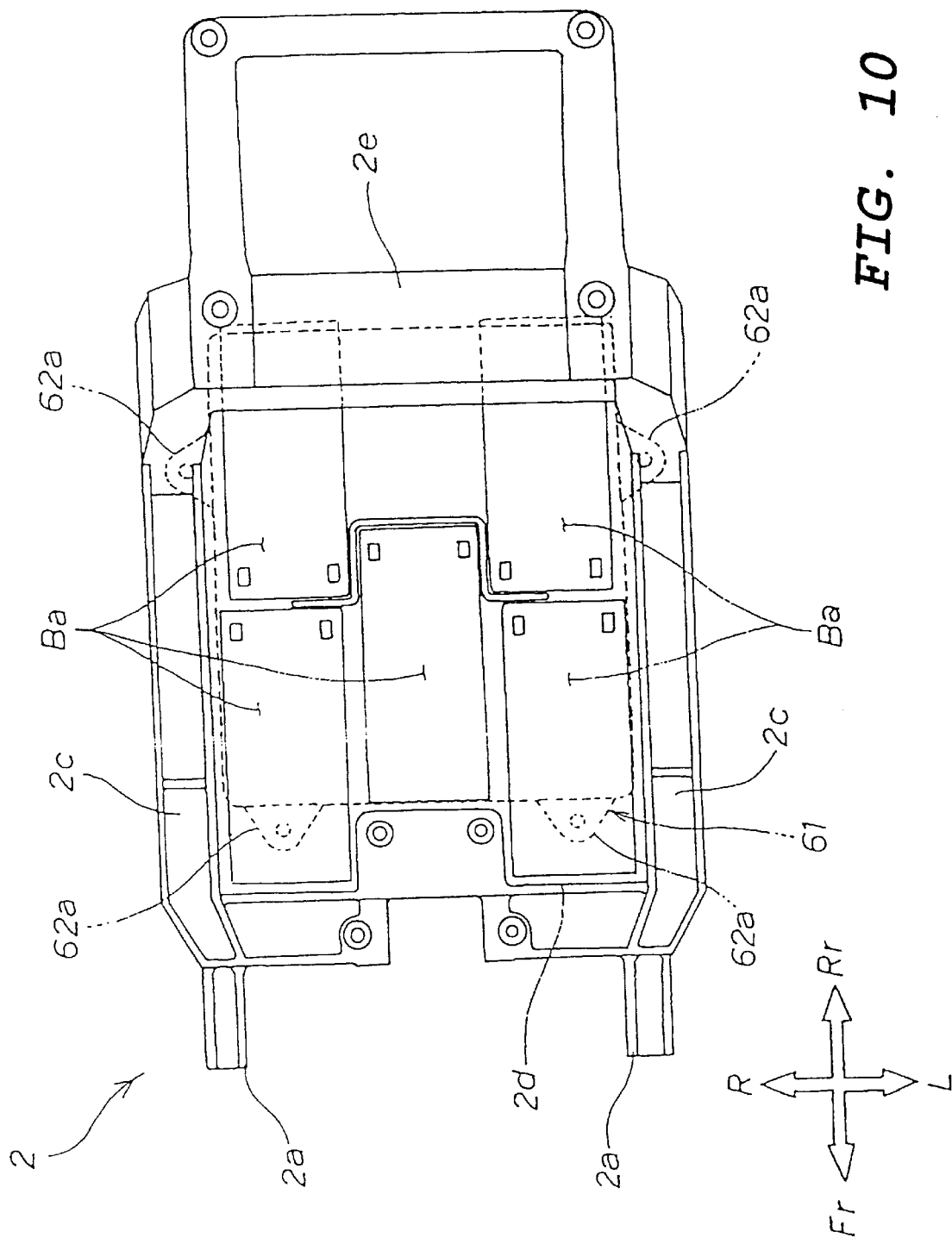
FIG. 10 is a plan view of the main frame with batteries mounted thereon.

FIG. 10 is a plan view of the main frame 2 according to the present invention with a plurality of batteries Ba mounted thereon. The plural batteries Ba are disposed at lower positions of the front portion of the vehicle body frame 57. More specifically, in the main frame 2, right and left side members 2c, 2c extend longitudinally on both sides of the vehicle body. Front ends of the right and left side members 2c, 2c are connected together through a front cross member 2d. Further, the rear ends of the right and left side members 2c, 2c are connected together through a rear cross member 2e which is in the shape of a gateway when seen from the back thereof.

Thus, according to the shape of the main frame 2, its central bottom comes out except its front portion. A receptacle case 61, which also serves as a bottom plate, is mounted to the main frame 2 and most of the five batteries Ba are placed on the bottom plate. The plural batteries Ba are for the supply of electric power to the motor 6b shown in FIG. 1. The batteries Ba are arranged transversely between the right and left side members 2c, 2c in three rows, and they are arranged longitudinally in two rows in a zigzag fashion. Accordingly, the main frame 2 becomes large in width.

Figure 11:
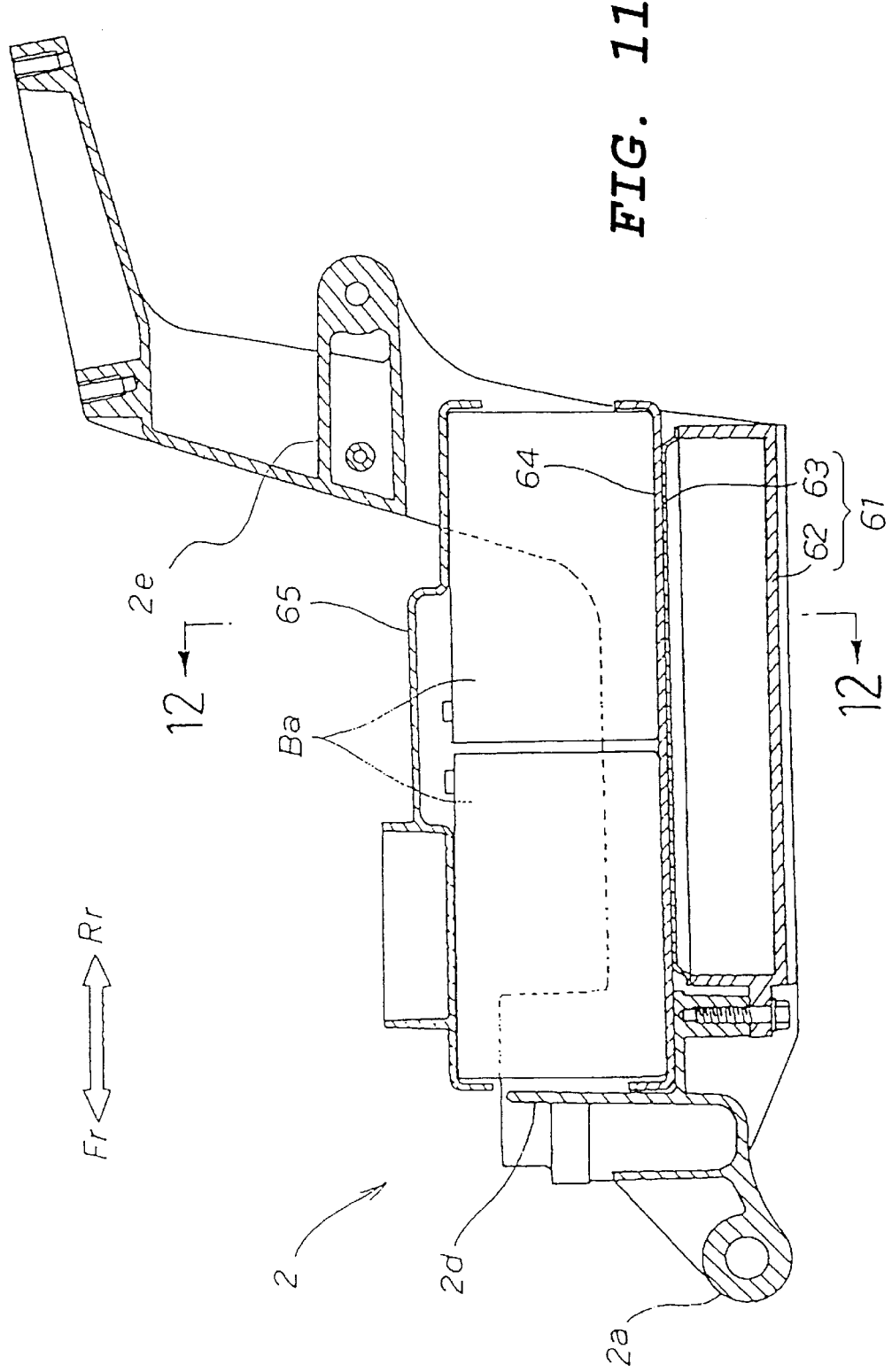
FIG. 11 is a sectional side view thereof.

FIG. 11 is a sectional side view of the main frame 2 according to the present invention with the plural batteries Ba mounted thereon. As shown therein, the rear cross member 2e, which is in the shape of a gateway, is formed to straddle over the batteries Ba from above.

Figure 12:
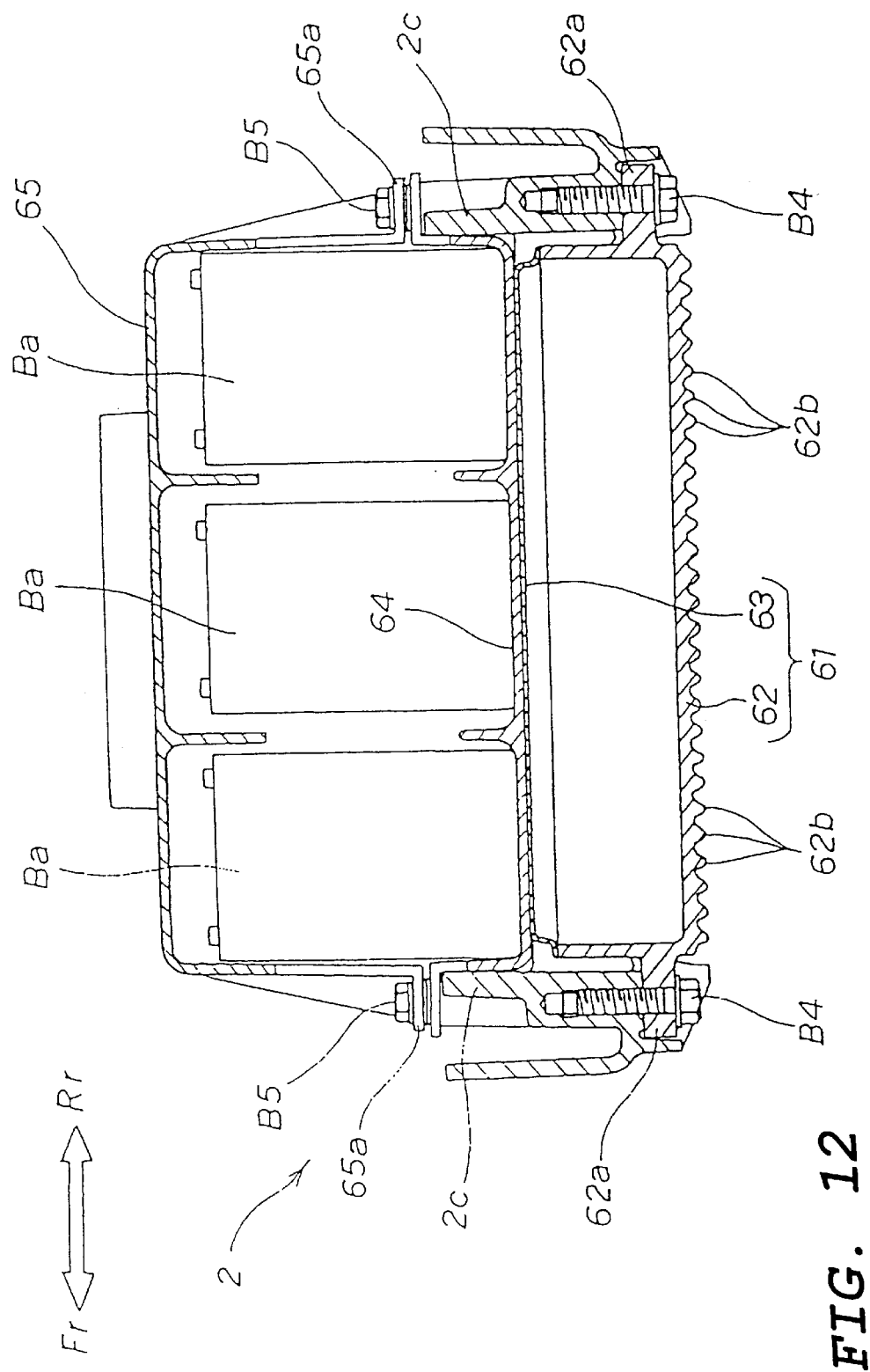
FIG. 12 is a sectional view taken on line 12—12 in FIG. 11.

FIG. 12 is a sectional view taken on line 12—12 in FIG. 11, showing that the main frame 2 in a bottom extracted shape has been closed with the receptacle case 61. The receptacle case 61 is formed of a light alloy for accommodating a unit (not shown) including electronic circuits for driving and controlling the motor 6b (see FIG. 1). The case 61 comprises a case body 62 and a lid 63 for closing the upper portion of the case body 62. The case 61 is inserted from below into the opening of the main frame 2, and flanges 62a of the case body 62 are secured to the underside of the main frame 2 with bolts B4.

A combined structure of the receptacle case 61 and the unit housed therein will hereinafter be referred to as a "control unit." As described above, the main frame 2 extends lower than the head pipe 52 and is then provided with the paired right and left side members (frames) 2c, 2c substantially in parallel with the ground surface, which constitutes a part of the vehicle body frame 57.

In the present invention, a control unit is fixed at a lower position between the right and left side members 2c, 2c, spanning both side members 2c, 2c and the plural batteries Ba are mounted on the control unit. Further, a resinous partition plate 64 for partitioning the plural batteries Ba is arranged on the main frame 2 from above and is secured to the upper surface of the main frame with bolts B5. It should be noted that the use of the partition plate 64 is optional.

The plural batteries Ba are covered with a battery cover 65, and flanges 65a of the battery cover 65 are secured to the upper surface of the main frame 2 with bolts B5. As described above, since most of the batteries Ba are placed on the receptacle case 61 serving also as a bottom plate of the main frame 2, it is not necessary to provide a tray or the like to receive the batteries, thus permitting a reduction in the number of components used. Also, since the bottom of the main frame 2 is closed with the receptacle case 61, the rigidity of the main frame 2 is enhanced.

Moreover, since the receptacle case 61 is exposed below the main frame 2, the heat radiation from the control unit is enhanced. Heat radiating fins 62b formed on the underside of the receptacle case 61 contribute to a further enhancement of the heat radiation. Additionally, since the case 61 is formed of a light alloy, which is superior in heat conductivity, the heat generated from the batteries Ba can be easily dissipated.

Figure 13A:
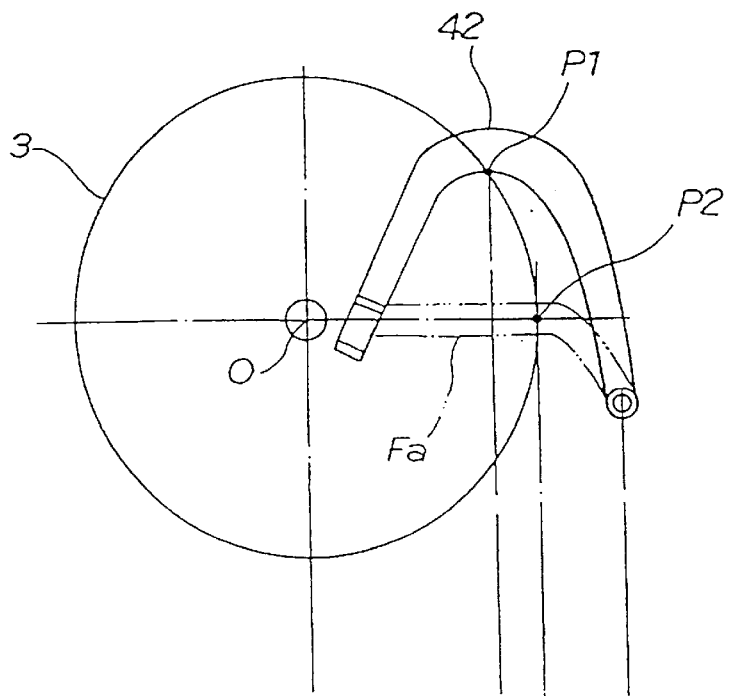
FIGS. 13(a)–13(c) are explanatory views showing a relation between a front swing arm and a front wheel.
Figure 13B:
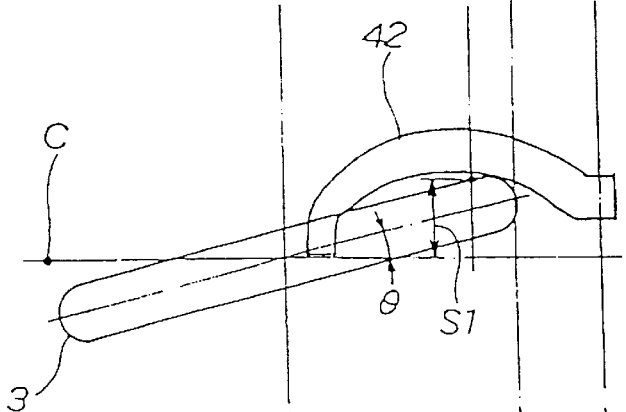
Figure 13C:
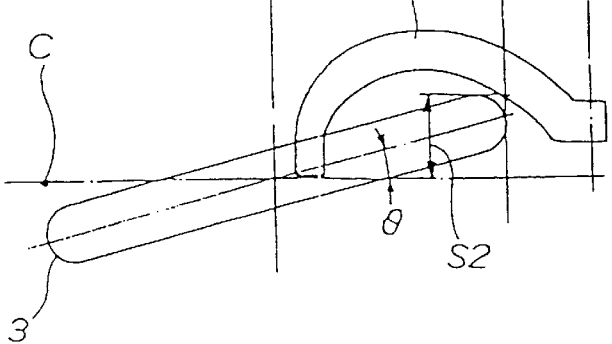

Next, the reason why the front swing arm 42 is generally formed in an inverted U-shape when viewed from the side will be set forth below with reference to FIGS. 13(a)–13(c). FIGS. 13(a) to 13(c) are explanatory views showing a relation between the front swing arm 42 and the front wheel 3. In FIG. 13(a), the member indicated with a solid line is the front swing arm 42 of the present invention, while the member shown in phantom is a front swing arm Fa as a comparative example. Since the front swing arm 42 is formed generally in an inverted U-shape when viewed from the side, the front swing arm and the outer peripheral edge of the front wheel 3 overlap each other at the point P1 close to the front wheel center O. On the other hand, the front swing arm Fa extends horizontally at the central height of the front wheel 3. The front swing arm Fa and the outer peripheral edge of the front wheel 3 overlap each other at the point P2 farthest from the front wheel center O.

FIG. 13(c) is a plan view showing a relation between the front swing arm Fa as a comparative example and the front wheel 3. When the front wheel 3 is turned at a steering angle of θ, a slant distance from the vehicle body center C up to the outer edge of the front wheel 3 is S2. It is necessary that the front swing arm Fa bypass the front wheel 3 by the large slant distance S2 to avoid hitting the front wheel 3. Therefore, the amount of projection of the front swing arm Fa in the vehicular transverse direction is large.

FIG. 13(b) is a plan view showing a relation between the front swing arm 42 of the present embodiment and the front wheel 3. The front swing arm 42 and the outer peripheral edge of the front wheel 3 overlap each other at the point P1, so when the front wheel 3 is turned at the steering angle of θ, the slant distance from the vehicular body center C up to the outer edge of the front wheel is S1, which is smaller than the slant distance S2 in the above comparative example.

Therefore, it suffices for the swing arm 42 to bypass the front wheel 3 by the small slant distance S1, and hence the amount of projection of the front swing arm 42 in the vehicular transverse direction can be small, with the result that the size of the two-wheeled motor vehicle becomes smaller. As noted above, the front swing arm 42 and the outer peripheral edge of the front wheel 3 overlap each other at a higher position (the position of point P1) than the front wheel center O. At this overlapping position, the deflection of the front wheel 3 when steered is smaller than that of the outer peripheral edge of the front wheel 3 at the height of the front wheel center O. Therefore, it suffices for the front swing arm 42 to bypass the front wheel 3 at a position where the deflection of the front wheel is small.

Now, the operation of the front suspension system 4 will be described below with reference to FIGS. 4 and 7. The front damper 45 shown in FIG. 4 attenuates the amplitude of vibration in the swing direction of the front swing arm 42. Additionally, as shown in FIGS. 7(a) and 7(b), an impact force in the upper swing direction of the front swing arm 42 is transmitted to the resin spring 44 from the back of the front swing arm 42, while an impact force in the lower swing direction of the front swing arm 42 is transmitted to the resin spring 44 from the holding plate 49. At this time, the resin spring 44 undergoes an elastic deformation and exhibits a spring action to cushion the impact forces.

Thus, in the front suspension system 4, impact forces are cushioned by the resin spring 44, and the amplitude of vibration is attenuated by the front damper 45. In this way, the resin spring 44 displays its spring action with a small stroke corresponding to only its elastic deformation, thus making it possible to cope with a wide range of loads from small to large. The resin spring 44 is extremely small in size as compared with a coiled spring.

Consequently, in comparison with a conventional suspension having both a coiled spring and a damper incorporated integrally therein, a small stroke suffices over a wide range of loads. The front suspension thereby attains a small size, and it can therefore be installed easily in a narrow space.

Figure 14:
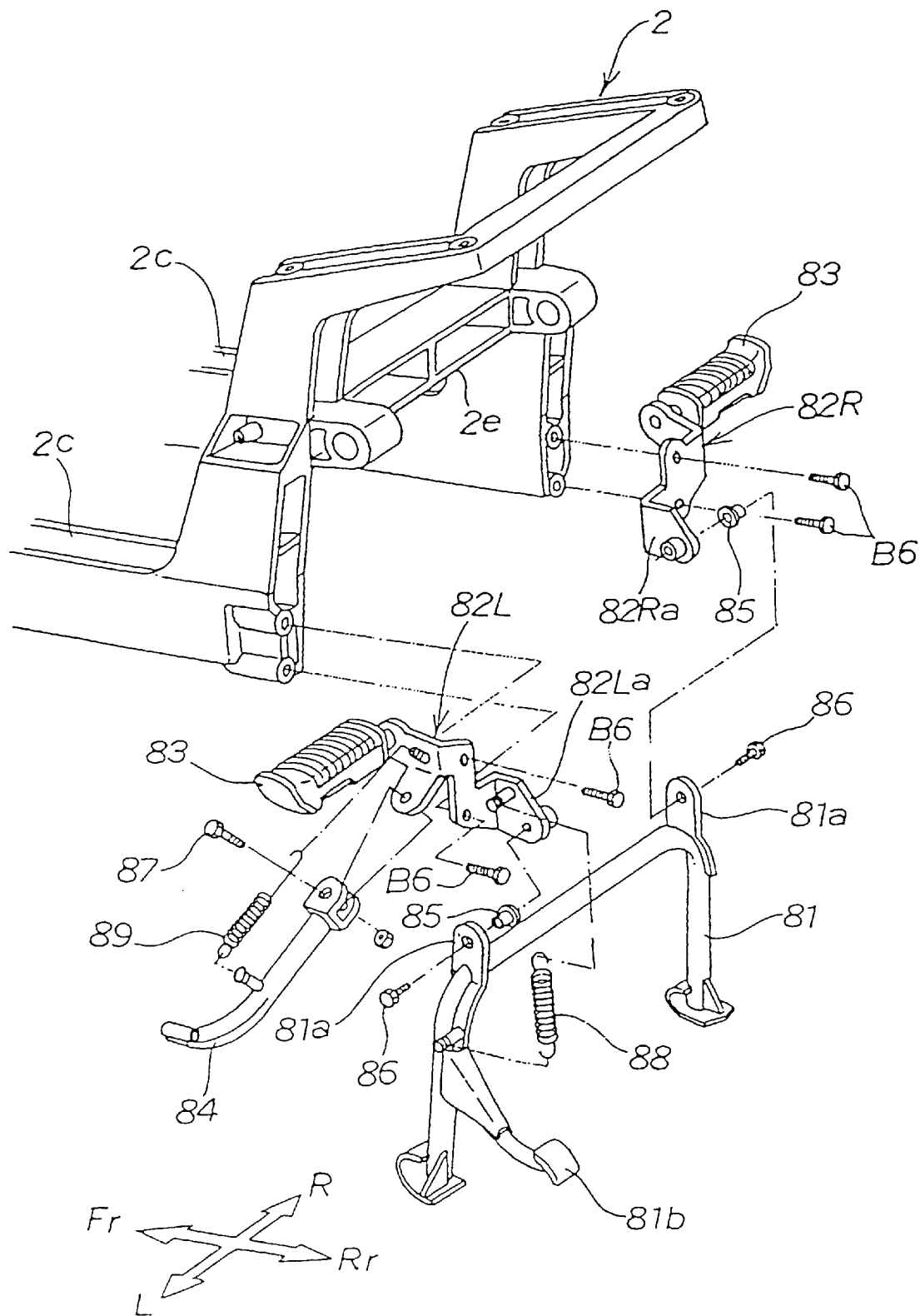
FIG. 14 is an exploded perspective view of a main stand mounting structure according to the present invention.

FIG. 14 is an exploded perspective view of the main stand mounting structure according to the present invention. Left and right main stand brackets 82L, 82R are secured respectively to the rear end portions of the left and right side members 2c, 2c of the main frame 2 with bolts B6. The main stand 81 having an arched shape is mounted to the left and right main stand brackets 82L, 82R for swinging movement in the longitudinal direction. Rider steps 83, 83 are also attached to the left and right main stand brackets 82L, 82R.

The left and right main stand brackets 82L, 82R have respective rearwardly extending portions 82La and 82Ra. Left and right stays 81a, 81a of the main stand 81 are connected respectively to the rearwardly extending portions 82La and 82Ra through bearings (bushings) 85, 85 and pivot shafts 86, 86 so as to be swingable back and forth.

The main stand 81 is provided with a pedal portion 81b extending rearwardly from its left rear portion so that the main stand 81 can be raised by operation of the pedal portion 81b. Further, a side stand 84 is secured to the left main stand bracket 82L through a pivot shaft 87 so as to be swingable back and forth. Tension springs 88, 89 are used to bias the main stand 81 and the side stand 84, respectively.

Figure 15:
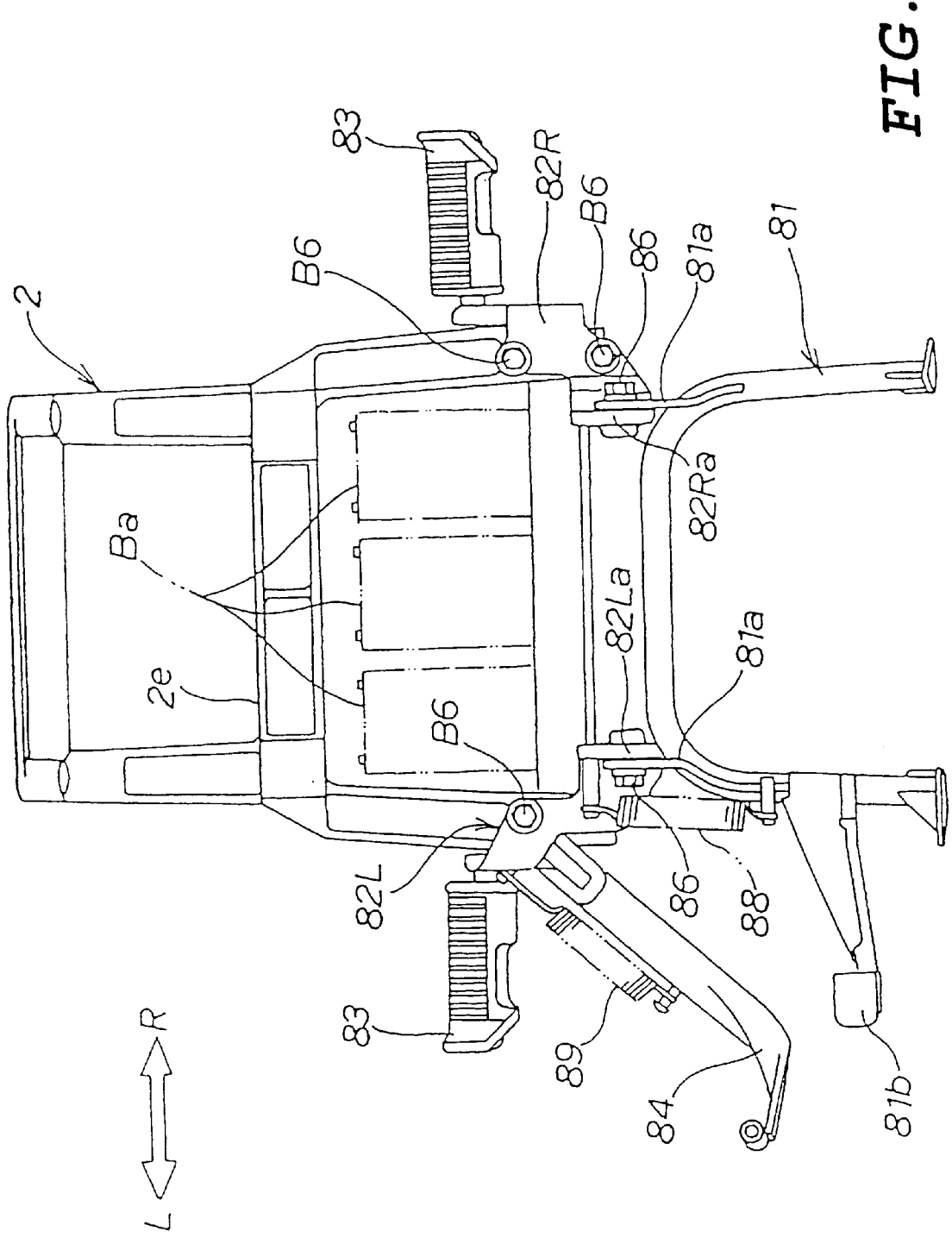
FIG. 15 is a rear view showing the main stand mounted to the main frame.

FIG. 15 is a rear view showing a mounted state of the main stand 81 to the main frame 2 according to the present invention. The main frame 2 has enhanced rigidity to carry the batteries Ba thereon. Such a highly rigid main frame 2 permits the main stand 81 to be mounted swingably with only the left and right main stand brackets 82L, 82R. Consequently, it is no longer required to use a transversely extending support pipe, or a long rod, which has so far been considered to be an essential component. Thus, it is possible to reduce the overall weight of the vehicle.

The left and right main stand brackets 82L, 82R are each independent. The left and right stays 81a, 81a extend from the main stand 81, and the pivot shafts 86, 86 of the main stand 81 are made short and independently of one another. Therefore, a long pivot shaft is no longer needed on the main frame 2 side and it is possible to reduce the weight of the main frame 2.

Figure 16:
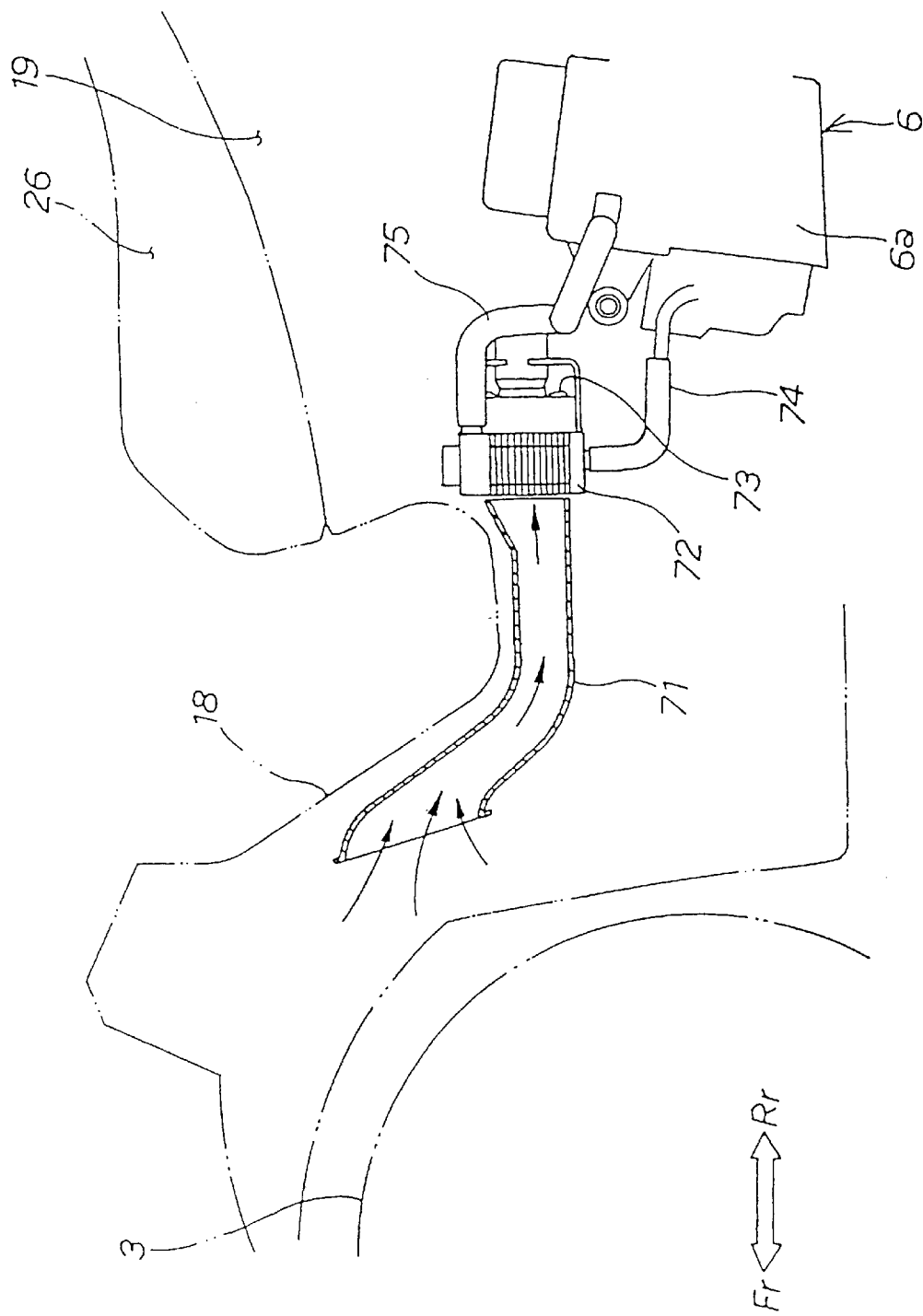
FIG. 16 is a side view of a radiator and other components arranged near the radiator according to the present invention.

FIG. 16 is a side view of other of the present invention, including a radiator 72. As shown in FIG. 16, an air duct 71 which extends longitudinally is disposed below the center cowl 18. The radiator 72 and a radiator fan 73 are disposed behind the air duct 71 and below the seat 26. Cooling water hoses 74 and 75 are connected between the radiator 72 and a water-cooling jacket of the engine 6a. Traveling air from the front of the vehicular body passes through the air duct 71 to cool the radiator 72. Since the radiator 72 is disposed below the seat 26, short hoses are employable as the cooling water hoses 74 and 75.

The above construction of the present invention allows the pivot shafts of the main stand to be formed as right and left pivot shafts which are short and independent of one another. Therefore, it is no longer necessary to use a long pivot shaft on the frame, and hence it is possible to attain a reduction in the weight of the frame.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A main stand mounting structure for a two-wheeled vehicle having a frame, said main stand mounting structure comprising:
   a main stand;
   a pair of spaced-apart stays extending from said main stand;
   a pair of brackets attachable to said frame in a spaced-apart manner; and
   a pair of pivot shafts pivotally connecting said pair of stays to said pair of brackets so that said main stand is pivotable about said pair of pivot shafts,
   wherein at least one of said brackets includes a rider step.

2. The main stand mounting structure according to claim 1, wherein said pivot shafts are spaced apart along a pivot axis about which said main stand pivots.

3. The main stand mounting structure according to claim 1, wherein said main stand includes a pair of legs having upper ends interconnected by a cross member.

4. The main stand mounting structure according to claim 3, wherein said stays are located at junctions between said pair of legs and said cross member.

5. The main stand mounting structure according to claim 3, wherein one of said legs includes a pedal extending therefrom.

6. The main stand mounting structure according to claim 1, further comprising a spring interconnected between said main stand and one of said brackets.

7. The main stand mounting structure according to claim 1, further comprising a side stand pivotally attached to one of said brackets.

8. The main stand mounting structure according to claim 7, further comprising a spring interconnected between said side stand and said one of said brackets.

9. The main stand mounting structure according to claim 1, wherein both of said brackets includes a rider step.

10. A main stand mounting structure for a two-wheeled vehicle having a frame, the frame having right and left side members extending longitudinally on right and left sides of the frame, said main stand mounting structure comprising:
    a main stand including a pair of legs having upper ends interconnected by a cross member;
    a pair of spaced-apart stays extending from right and left sides of said main stand, said stays being located at junctions between said pair of legs and said cross member;
    a pair of brackets attachable to rear portions of the right and left side members of the frame in a spaced-apart manner;
    a pair of pivot shafts pivotally connecting said pair of stays to said pair of brackets so that said main stand is pivotable about said pair of pivot shafts, said pivot shafts being spaced apart along a pivot axis about which said main stand pivots;
    a spring interconnected between said main stand and one of said brackets;
    a side stand pivotally attached to said one of said brackets; and
    a spring interconnected between said side stand and said one of said brackets.

11. A main stand mounting structure for a two-wheeled vehicle comprising:
    a frame having right and left side members extending longitudinally on right and left sides of the frame in a spaced-apart manner, said right and left side members having rearmost end faces;
    a main stand;
    a pair of spaced-apart stays extending from right and left sides of said main stand;
    a pair of brackets detachably attached to said rearmost end faces of the right and left side members of the frame in a spaced-apart manner;
    a pair of removable fasteners detachably attaching said pair of brackets to said rearmost end faces of said right and left side members; and
    a pair of pivot shafts pivotally connecting said pair of stays to said pair of brackets so that said main stand is pivotable about said pair of pivot shafts in a spaced-apart manner.

12. The main stand mounting structure according to claim 11, wherein said pivot shafts are spaced apart along a pivot axis about which said main stand pivots.

13. The main stand mounting structure according to claim 11, wherein said main stand includes a pair of legs having upper ends interconnected by a cross member.

14. The main stand mounting structure according to claim 13, wherein said stays are located at junctions between said pair of legs and said cross member.

15. The main stand mounting structure according to claim 13, wherein one of said legs includes a pedal extending therefrom.

16. The main stand mounting structure according to claim 11, further comprising a spring interconnected between said main stand and one of said brackets.

17. The main stand mounting structure according to claim 11, further comprising a side stand pivotally attached to one of said brackets.

18. The main stand mounting structure according to claim 11, wherein at least one of said brackets includes a rider step.

19. A main stand mounting structure for a two-wheeled vehicle having a frame, the frame having right and left side members extending longitudinally on right and left sides of the frame, said main stand mounting structure comprising:
    a main stand including a pair of legs having upper ends interconnected by a cross member;
    a pair of spaced-apart stays extending from right and left sides of said main stand, said stays being located at junctions between said pair of legs and said cross member;
    a pair of brackets attachable to rear portions of the right and left side members of the frame in a spaced-apart manner; and
    a pair of pivot shafts pivotally connecting said pair of stays to said pair of brackets so that said main stand is pivotable about said pair of pivot shafts, said pivot shafts being spaced apart along a pivot axis about which said main stand pivots,
    wherein at least one of said brackets includes a rider step.

20. The main stand mounting structure according to claim 19, further comprising:
    a spring interconnected between said main stand and one of said brackets;
    a side stand pivotally attached to said one of said brackets; and
    a spring interconnected between said side stand and said one of said brackets.

21. A main stand mounting structure for a two-wheeled vehicle having a frame, said main stand mounting structure comprising:
   a main stand;
   a pair of spaced-apart stays extending from said main stand;
   a pair of brackets attachable to said frame in a spaced-apart manner;
   a pair of pivot shafts pivotally connecting said pair of stays to said pair of brackets so that said main stand is pivotable about said pair of pivot shafts; and
   a side stand pivotally attached to one of said brackets.

22. The main stand mounting structure according to claim 21, further comprising a spring interconnected between said side stand and said one of said brackets.

23. A main stand mounting structure for a two-wheeled vehicle having a frame, the frame having right and left side members extending longitudinally on right and left sides of the frame, said main stand mounting structure comprising:
   a main stand;
   a pair of spaced-apart stays extending from right and left sides of said main stand;
   a pair of brackets attachable to rear portions of the right and left side members of the frame in a spaced-apart manner;
   a pair of pivot shafts pivotally connecting said pair of stays to said pair of brackets so that said main stand is pivotable about said pair of pivot shafts; and
   a side stand pivotally attached to one of said brackets.

24. The main stand mounting structure according to claim 23, wherein said pivot shafts are spaced apart along a pivot axis about which said main stand pivots.

25. The main stand mounting structure according to claim 23, wherein said main stand includes a pair of legs having upper ends interconnected by a cross member.

26. The main stand mounting structure according to claim 25, wherein said stays are located at junctions between said pair of legs and said cross member.

27. The main stand mounting structure according to claim 25, wherein one of said legs includes a pedal extending therefrom.

28. The main stand mounting structure according to claim 23, further comprising a spring interconnected between said main stand and one of said brackets.

29. A main stand mounting structure for a two-wheeled vehicle having a frame, the frame having right and left side members extending longitudinally on right and left sides of the frame, said main stand mounting structure comprising:
   a main stand;
   a pair of spaced-apart stays extending from right and left sides of said main stand;
   a pair of brackets attachable to rear portions of the right and left side members of the frame in a spaced-apart manner; and
   a pair of pivot shafts pivotally connecting said pair of stays to said pair of brackets so that said main stand is pivotable about said pair of pivot shafts,
   wherein at least one of said brackets includes a rider step.

30. The main stand mounting structure according to claim 29, wherein said pivot shafts are spaced apart along a pivot axis about which said main stand pivots.

31. The main stand mounting structure according to claim 29, wherein said main stand includes a pair of legs having upper ends interconnected by a cross member.

32. The main stand mounting structure according to claim 31, wherein said stays are located at junctions between said pair of legs and said cross member.

33. The main stand mounting structure according to claim 31, wherein one of said legs includes a pedal extending therefrom.

34. The main stand mounting structure according to claim 29, further comprising a spring interconnected between said main stand and one of said brackets.

* * * * *